US011080052B2

(12) United States Patent
Gschwind et al.

(10) Patent No.: US 11,080,052 B2
(45) Date of Patent: Aug. 3, 2021

(54) DETERMINING THE EFFECTIVENESS OF PREFETCH INSTRUCTIONS

(71) Applicant: INTERNATIONAL BUSINESS MACHINES CORPORATION, Armonk, NY (US)

(72) Inventors: Michael K. Gschwind, Chappaqua, NY (US); Christian Jacobi, Poughkeepsie, NY (US); Anthony Saporito, Highland, NY (US); Chung-Lung K. Shum, Wappingers Falls, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/668,527

(22) Filed: Oct. 30, 2019

(65) Prior Publication Data

US 2020/0065253 A1 Feb. 27, 2020

Related U.S. Application Data

(63) Continuation of application No. 15/214,624, filed on Jul. 20, 2016, now Pat. No. 10,521,350.

(51) Int. Cl.
*G06F 9/30* (2018.01)
*G06F 12/0875* (2016.01)
*G06F 9/38* (2018.01)

(52) U.S. Cl.
CPC ........ *G06F 9/30047* (2013.01); *G06F 9/3802* (2013.01); *G06F 9/383* (2013.01); *G06F 12/0875* (2013.01); *G06F 2212/452* (2013.01)

(58) Field of Classification Search
None
See application file for complete search history.

(56) References Cited

U.S. PATENT DOCUMENTS 5,392,443 A 2/1995 Sakakibara
5,758,119 A 5/1998 Mayfield et al.
(Continued)

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Corey S Faherty
(74) *Attorney, Agent, or Firm* — Steven Chiu Esq.; Blanche E. Schiller, Esq.; Heslin Rothenberg Farley & Mesiti P.C.

(57) ABSTRACT

Effectiveness of prefetch instructions is determined. A prefetch instruction is executed to request that data be fetched into a cache of the computing environment. The effectiveness of the prefetch instruction is determined. This includes updating, based on executing the prefetch instruction, a cache directory of the cache. The updating includes, in the cache directory, effectiveness data relating to the data. The effectiveness data includes whether the data was installed in the cache based on the prefetch instruction. Additionally, the determining the effectiveness includes obtaining at least a portion of the effectiveness data from the cache directory, and using the at least a portion of effectiveness data to determine the effectiveness of the prefetch instruction.

20 Claims, 7 Drawing Sheets

(56) References Cited

U.S. PATENT DOCUMENTS

| | | | |
|---|---|---|---|
| 5,802,569 A | 9/1998 | Genduso | |
| 5,835,967 A | 11/1998 | McMahan | |
| 5,948,081 A | 9/1999 | Foster | |
| 6,055,621 A * | 4/2000 | Puzak | G06F 9/3802 712/207 |
| 6,560,693 B1 | 5/2003 | Puzak et al. | |
| 6,574,713 B1 * | 6/2003 | Kosche | G06F 8/4442 711/117 |
| 6,662,273 B1 | 12/2003 | Wilkerson | |
| 7,222,217 B2 | 5/2007 | Gray | |
| 7,350,030 B2 | 3/2008 | Rotithor et al. | |
| 7,386,683 B2 | 6/2008 | Blumrich et al. | |
| 7,506,105 B2 | 3/2009 | Al-Sukhni et al. | |
| 7,840,761 B2 | 11/2010 | Colavin | |
| 7,958,316 B2 | 6/2011 | Speight et al. | |
| 7,958,317 B2 | 6/2011 | Speight et al. | |
| 8,135,642 B1 | 3/2012 | Krause | |
| 8,255,631 B2 | 8/2012 | Chen et al. | |
| 8,266,344 B1 | 9/2012 | Lampert | |
| 8,707,014 B2 | 4/2014 | Yamazaki | |
| 8,812,822 B2 | 8/2014 | Luick | |
| 9,081,501 B2 | 7/2015 | Asaad et al. | |
| 10,169,239 B2 | 1/2019 | Greiner et al. | |
| 2002/0087802 A1 | 7/2002 | Al-Dajani | |
| 2002/0099913 A1 | 7/2002 | Steely, Jr. | |
| 2002/0144054 A1 * | 10/2002 | Fanning | G06F 9/383 711/108 |
| 2002/0174303 A1 | 11/2002 | Gelman | |
| 2003/0005419 A1 * | 1/2003 | Pieper | G06F 8/4442 717/141 |
| 2003/0046494 A1 | 3/2003 | Ziegler | |
| 2004/0049640 A1 | 3/2004 | So | |
| 2004/0268045 A1 | 12/2004 | Gray | |
| 2005/0175027 A1 | 8/2005 | Miller | |
| 2006/0136228 A1 | 6/2006 | Lin | |
| 2006/0143401 A1 | 6/2006 | Doweck et al. | |
| 2006/0274750 A1 | 12/2006 | Babbar | |
| 2008/0091921 A1 | 4/2008 | Abuaiadh et al. | |
| 2009/0199190 A1 | 8/2009 | Chen | |
| 2010/0010965 A1 | 1/2010 | Edlund et al. | |
| 2011/0307455 A1 | 12/2011 | Gupta | |
| 2012/0226892 A1 | 9/2012 | Tirumalai et al. | |
| 2013/0151784 A1 | 6/2013 | Bell | |
| 2013/0159630 A1 | 6/2013 | Lichmanov | |
| 2013/0282987 A1 | 10/2013 | Koob | |
| 2013/0332705 A1 | 12/2013 | Martinez | |
| 2013/0346694 A1 | 12/2013 | Krick | |
| 2014/0115245 A1 | 4/2014 | Maybee et al. | |
| 2014/0129773 A1 | 5/2014 | Habermann et al. | |
| 2014/0156932 A1 | 6/2014 | Dundas | |
| 2014/0281248 A1 | 9/2014 | Alameldeen | |
| 2015/0058308 A1 | 2/2015 | Zheng | |
| 2015/0089139 A1 | 3/2015 | Zaks | |
| 2015/0095577 A1 | 4/2015 | Vijayrao et al. | |
| 2015/0142762 A1 | 5/2015 | Konik et al. | |
| 2015/0161065 A1 | 6/2015 | Lunadier | |
| 2015/0309944 A1 | 10/2015 | Sadoughi-Yarandi et al. | |
| 2015/0331800 A1 | 11/2015 | Kimura | |
| 2015/0378917 A1 | 12/2015 | Busaba et al. | |
| 2015/0378918 A1 | 12/2015 | Busaba et al. | |
| 2016/0026580 A1 | 1/2016 | Dooley et al. | |
| 2016/0314069 A1 | 10/2016 | Luttrell | |
| 2017/0024165 A1 | 1/2017 | Kazama | |
| 2017/0046202 A1 | 2/2017 | Bao | |
| 2017/0123979 A1 | 5/2017 | V | |
| 2017/0132124 A1 | 5/2017 | Gschwind et al. | |
| 2017/0132133 A1 | 5/2017 | Gschwind et al. | |
| 2017/0132134 A1 | 5/2017 | Gschwind et al. | |
| 2017/0132135 A1 | 5/2017 | Gschwind et al. | |
| 2017/0132147 A1 | 5/2017 | Loh | |
| 2018/0024836 A1 | 1/2018 | Gschwind et al. | |
| 2018/0024930 A1 | 1/2018 | Gschwind et al. | |
| 2018/0024933 A1 | 1/2018 | Greiner et al. | |
| 2018/0060241 A1 | 3/2018 | Greiner et al. | |

OTHER PUBLICATIONS

IBM, "z/Architecture—Principles of Operation," SA22-7832-10, Eleventh Edition, Mar. 20, 2015, pp. 1-1732.

IBM, "Power ISA—V2.07B," Apr. 9, 2015, pp. 1-1527.

Chen, Yong et al., "Global-aware and multi-order context-based prefetching for high-performance processors," The International Journal of High Performance Computing Applications, Mar. 31, 2016, pp. 1-16.

Anonymous, "Prefetching Mechanism with Cache-Aware Optimized Control," IPCOM000211215D, Sep. 27, 2011, p. 1 (+ cover).

Ailamaki, Anastassia et al., "DBMSs on a Modern Processor: Where Does Time Go?," Proceedings of the 25$^{th}$ VLDB Conference, Edinburgh, Scotland, Sep. 1999, pp. 266-277.

Anonymous, "Method for Priority-Based Cache-Line Residency," IPCOM000128946, Sep. 2005, pp. 1-3 (+ cover).

Song, SP, "Methods of Specifying Data Prefetching Without Using a Separate Instruction," IPCOM000115743, Jun. 1, 1995, pp. 355-356 (+ cover).

Arnold, Ronny L., et al., "A Method for Qualifying Instruction Line Prefetch With a Line-Wrapped Cache," May 1996, pp. 161-163 (+ cover).

Johnson, Teresa L. et al., "Run-time Spatial Locality Detection and Optimization," Proceeding of the 30$^{th}$ Annual ACM/IEEE International Symposium on MicroArchitecture, Dec. 1997, pp. 57-64.

Liu, L., "Utilization-Based Prefetching," IPCOM000063165D, Feb. 1985, pp. 1-2 (+ cover).

Bennett, B.T., et al., "Prefetching in a Multilevel Memory Hierarchy," IPCOM000049471D, pp. 1-2 (+ cover).

List of IBM Patents or Patent Applications Treated as Related, Nov. 20, 2019, pp. 1-2.

\* cited by examiner

US 11,080,052 B2

DETERMINING THE EFFECTIVENESS OF PREFETCH INSTRUCTIONS

BACKGROUND

One or more aspects relate, in general, to processing within a computing environment, and in particular, to processing associated with prefetch instructions.

Managed Runtime Environments, as well as other environments, may employ a garbage collection (GC) function to remove memory objects from a software heap that are no longer in use. This function typically has to access a large section, or perhaps all, of the heap to determine if an object is no longer referenced by any other object. Since a great deal of memory is accessed, the garbage collection function typically exploits prefetch instructions.

Examples of prefetch instructions include the Prefetch Data (PFD) and Prefetch Data Relative Long (PFDRL) instructions, as defined in the z/Architecture offered by International Business Machines Corporation, Armonk, N.Y. The prefetch instructions instruct the central processing unit (CPU) to prefetch data of a cache line into a local data cache prior to the time that data is needed. Therefore, when the CPU actually needs data from the cache line for a subsequent load or store instruction, it is typically already in the cache, or at least on its way to being delivered from a higher level cache or main memory.

In a Managed Runtime Environment (MRTE) or similar environment, the code that is generated is often compiled by a Just-In-Time (JIT) compiler using a JIT compilation technique. The JIT compiler typically generates prefetch instructions to improve performance by attempting to reduce the latency associated with cache misses.

In many cases, speculative prefetch requests are issued. This typically occurs when it is not known if a future branch path will be taken, but there is a chance to prefetch anyway. These speculative prefetches often significantly increase the number of prefetch requests the CPU is to process. However, in many cases these speculative prefetches do not improve performance, if the data is never actually needed, and can actually decrease overall performance due to wasted cache bandwidth.

SUMMARY

Shortcomings of the prior art are overcome and additional advantages are provided through the provision of a computer program product for facilitating processing within a computing environment. The computer program product includes a storage medium readable by a processing circuit and storing instructions for performing a method. The method includes executing a prefetch instruction to request that data be fetched into a selected location of a memory hierarchy of the computing environment. Effectiveness of the prefetch instruction is determined. The determining the effectiveness includes: providing, based on execution of the prefetch instruction, effectiveness information relating to the data, the effectiveness information including whether the data was installed in the cache based on the prefetch instruction; obtaining at least a portion of the effectiveness information; and using the at least a portion of effectiveness information to determine the effectiveness of the prefetch instruction.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided to determine the effectiveness of prefetch instructions. As indicated above, in a Managed Runtime Environment (MRTE) or similar environment, the code that is generated is often compiled by a Just-In-Time (JIT) compiler using a JIT compilation technique. The JIT compiler typically generates prefetch instructions to improve performance by attempting to reduce the latency associated with cache misses. However, with current techniques, there is no way for the MRTE/JIT compiler to know if the prefetch instruction is really effective. For example, the data that is requested to be prefetched could already be in the L1 cache, or in another level cache that is already close enough to the L1 cache such that the prefetch instruction served little value. However, the central processing unit (CPU) still had to process the prefetch instruction. Thus, instruction processing bandwidth and cache access bandwidth may have been wasted on the prefetch instruction. Therefore, in accordance with an aspect of the invention, a technique is provided to determine the effectiveness of software prefetch instructions.

As a further example, the prefetch instruction may not have been issued soon enough to be as effective as it might have been. The MRTE/JIT compiler can use the prefetch effectiveness information, in accordance with an aspect of the present invention, to move the prefetch instruction earlier, so that in the future, the data will be in the L1 cache when it is needed.

One embodiment of a computing environment to incorporate and use one or more aspects of the present invention is described with reference to FIG. 1. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE® is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA.

The computing environment may also be based on other architectures, including, but not limited to, the Intel 64 and IA-32 architectures. Other examples also exist.

Figure 1:
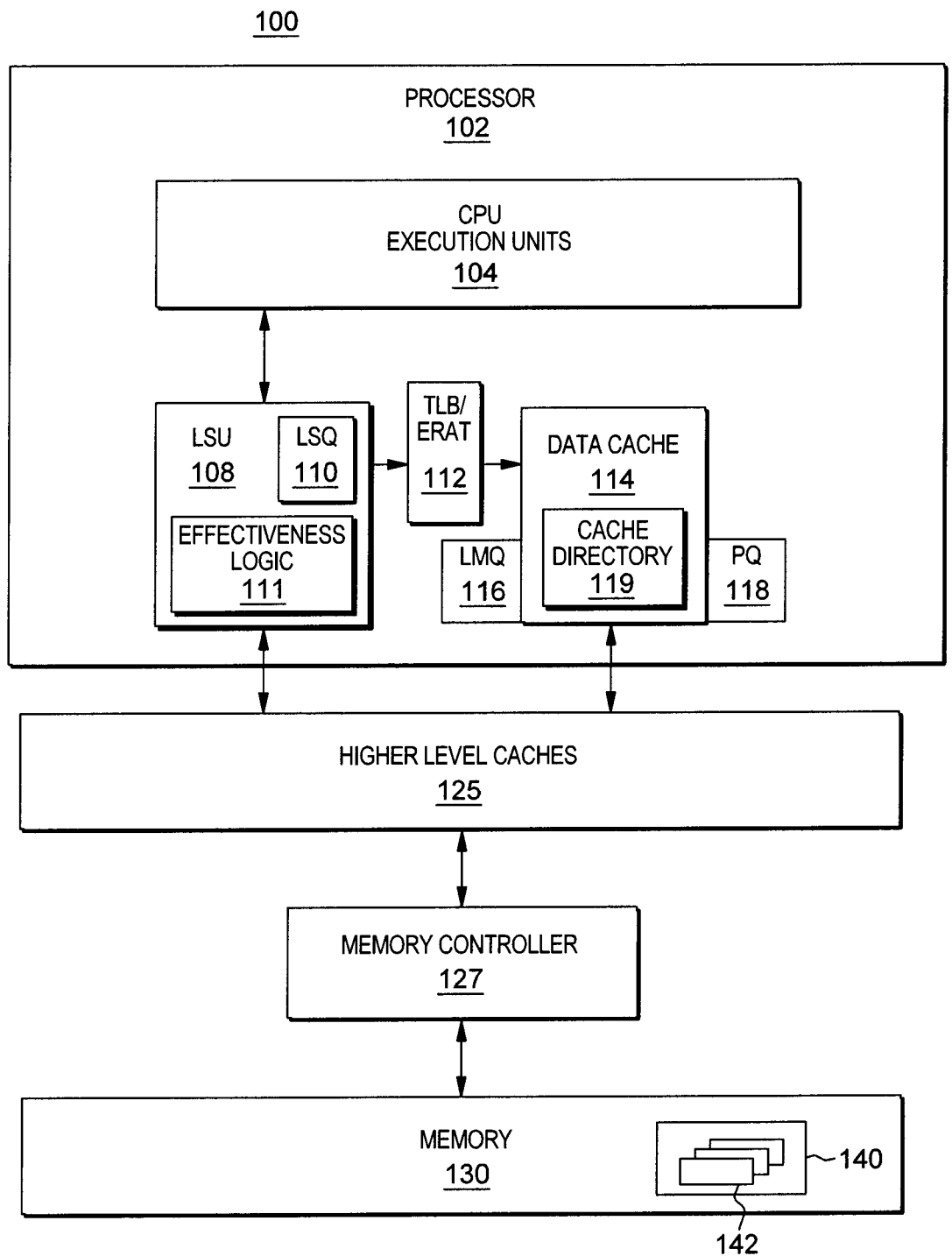
FIG. 1 depicts one example of a computing environment to incorporate and use one or more aspects of the present invention.

Referring to FIG. 1, in one example, a computing environment 100 includes at least one central processing unit (CPU) 102 (a.k.a., a processor) coupled to one or more higher level caches 125. Central processing unit 102 includes, for instance, one or more execution units 104 to request and consume data. Execution units 104 are coupled to a load/store unit (LSU) 108, which includes a load/store queue (LSQ) 110, and, in accordance with an aspect of the present invention, effectiveness logic 111 to determine the effectiveness of prefetch instructions. Load/store unit 108 issues memory access operations (loads and stores) that retrieve prefetched data or cause the data to be fetched from the memory subsystem or higher level caches. LSU 108 may be coupled to a data cache 114 via, e.g., a translation mechanism 112, indicated as, e.g., a translation look-aside buffer (TLB) or an effective to real address translation table (ERAT).

CPU 102 is coupled to and communicates with a memory hierarchy that includes, for instance, data cache 114, which is an L1 data cache; one or more higher level caches 125, which may include a single level two (L2) cache or multiple other sequentially numbered higher levels, e.g., L3, L4; a memory 130; and an associated memory controller 127, which controls accesses to memory 130. L1 data cache 114 serves as a prefetch buffer for data (and/or data streams) that are prefetched. L1 data cache 114 has a corresponding load miss queue (LMQ) 116, which the cache utilizes to save information about ongoing prefetch requests, and a prefetch queue (PQ) 118 to hold prefetch requests. In another embodiment, prefetch queue 118 may be integrated with load miss queue 116. Further, in one embodiment, data cache 114 has an associated cache directory 119, which may be implemented as part of the cache or be maintained separate therefrom.

Memory 130 may include at least one program product having a set (e.g., at least one) of program modules that are configured to carry out the functions of embodiments of the invention. Program/utility 140, having a set (at least one) of program modules 142, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 142 may generally carry out the functions and/or methodologies of embodiments of the invention described herein.

In addition to the example memory hierarchy, computing environment 100 may also include additional storage devices that form a part of the memory hierarchy from the perspective of CPU 102. The storage devices may be one or more electronic storage media, such as a floppy disk, hard drive, CD-ROM, or DVD. CPU 102 communicates with each of the above devices within the memory hierarchy by various mechanisms, including via buses and/or direct channels, as examples.

The buses may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Video Electronics Standards Association (VESA) local bus, and Peripheral Component Interconnect (PCI) bus.

Computing environment 100 executes different instructions to perform various tasks, including, but not limited to, prefetch instructions to prefetch data. Example prefetch instructions include the Prefetch Data (PFD) and Prefetch Data Relative Long (PFDRL) instructions implemented in the z/Architecture, and described below with reference to FIGS. 2A-2B.

Figure 2A:
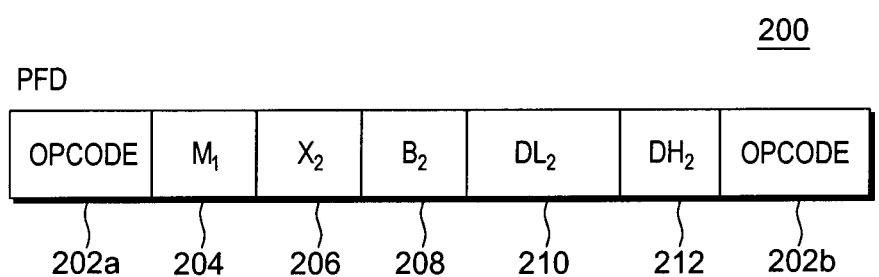
FIG. 2A depicts one example of a format of a Prefetch Data instruction, in accordance with an aspect of the present invention.

Referring to FIG. 2A, one example of a format of a Prefetch Data (PFD) instruction 200 includes, for instance, one or more opcode fields 202a, 202b that include an operation code specifying a prefetch data operation; a mask field ($M_1$) 204, also referred to as the first operand, that includes a code used to signal the CPU as to the intended use of the second operand (e.g., defined by the $X_2$, $B_2$, $DL_2$ and $DH_2$ fields of the instruction, described further); an index field ($X_2$) 206; a base field ($B_2$) 208; and a plurality of displacement fields $DL_2$ 210 and $DH_2$ 212. The contents of the register designated by $X_2$ field 206 are added to the contents of the register designated by $B_2$ field 208, and the result is added to the displacement indicated by the $DL_2$ and $DH_2$ fields 210, 212 to provide the second operand, which is a logical address; however, if either of the $X_2$ or $B_2$ fields contain zero, then the contents of the designated register is assumed to contain zeros.

Figure 2B:
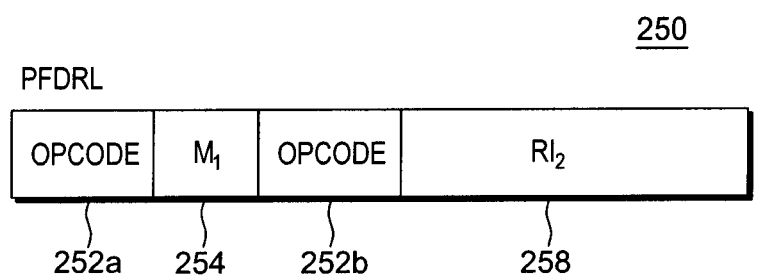
FIG. 2B depicts one example of a format of a Prefetch Data Relative Long instruction, in accordance with an aspect of the present invention.

As a further example, referring to FIG. 2B, a Prefetch Data Relative Long (PFDRL) instruction 250 includes, for instance, one or more opcode fields 252a, 252b that include an operation code specifying a prefetch data relative long operation; a mask field ($M_1$) 254, also referred to as the first operand, that includes a code used to signal the CPU as to the intended use of the second operand; and $RI_2$ 258 used to indicate a number of halfwords that are added to the address of the Prefetch Data Relative Long instruction to form the address of the second operand, as described below.

Subject to the controls specified in the $M_1$ field 204, 254, the CPU is signaled to perform one of the following operations: prefetch the second operand into a cache line; or release a cache line containing the second operand.

In particular, the $M_1$ field contains, e.g., a 4-bit unsigned binary integer that is used as a code to signal the CPU as to the intended use of the second operand. The codes are as follows, in one embodiment:

| Code | Function Performed |
|------|-------------------|
| 1 | Prefetch the data at the second operand address into a cache line for fetch access. |
| 2 | Prefetch the data at the second operand address into a cache line for store access. |
| 6 | Release the cache line containing the second operand from the store access; retain the data in the cache line for fetch access. |
| 7 | Release the cache line containing the second operand from all accesses. |

All other codes are reserved, in this embodiment. Depending on the model, the CPU may not implement all of the prefetch functions. For functions that are not implemented by the CPU, and for reserved functions, the instruction acts as a no-op (no operation). Code 0 acts as a no-op, in one example.

No access exceptions or program event recording (PER) storage alteration events are recognized for the second operand, in this embodiment. Further, code 2 has no effect on the change bit for the second operand. For all codes, it is model dependent whether any translation look-aside buffer (TLB) entry is formed for the data that is prefetched. For Prefetch Data, the displacement is treated as a 20-bit signed binary integer, in this example.

For Prefetch Data Relative Long, the contents of the $RI_2$ field 258 are a signed binary integer specifying the number of halfwords that is added to the address of the instruction to generate the address of the second operand. When dynamic address translation (DAT) is on, the second operand is accessed using the same addressing space mode as that used to access the instruction. When DAT is off, the second operand is accessed using a real address.

When Prefetch Data (Relative Long) is attempted in a nonconstrained transaction, and the code in the $M_1$ field is 6 or 7, the transaction may be aborted due to abort code 16. When Prefetch Data (Relative Long) is attempted in a constrained transaction, a transaction constraint program interruption is recognized, and the transaction is aborted with abort code 4.

The condition code remains unchanged, and in one example, the program exceptions include operation (if the general instructions extension facility is not installed); and transaction constraint.

The use of prefetch instructions may increase system performance; however, if the prefetch is unnecessary (e.g., since the data is already in the cache), the performance of the prefetch instruction and possibly system performance is negatively affected. Therefore, in accordance with an aspect of the present invention, the effectiveness of prefetch instructions is determined. One embodiment of the logic to determine effectiveness is described with reference to FIG. 3A. This logic is performed by a processor (e.g., load/store unit 108 (FIG. 1)).

Figure 3A:
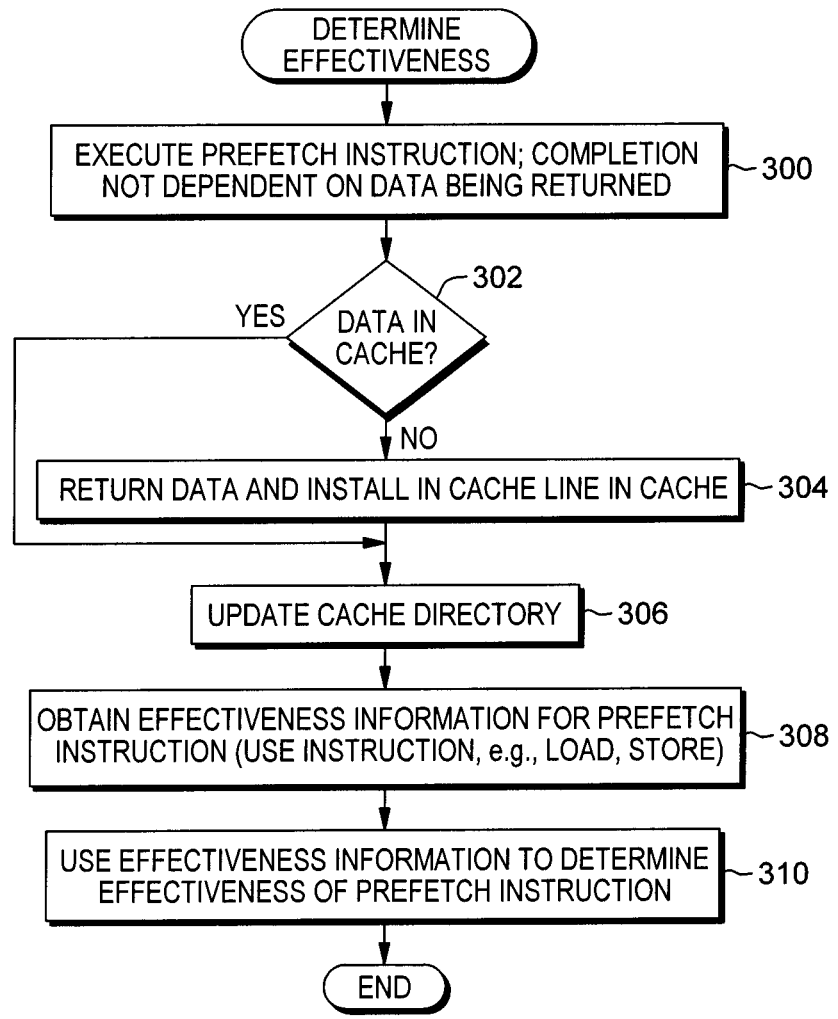
FIG. 3A depicts one embodiment of logic to determine the effectiveness of prefetch instructions, in accordance with an aspect of the present invention.

Referring to FIG. 3A, a prefetch instruction is executed, STEP 300. In this example, the prefetch instruction executes in a conventional manner in which completion of the instruction is not dependent on the data, if any, being returned. The return of the data, if any, occurs asynchronously. Based on executing the prefetch instruction, a determination is made as to whether the data is already in the cache, e.g., L1 data cache, INQUIRY 302. If the data is not already in the cache, then data is returned and installed in a cache line in the cache, STEP 304.

Figure 4:
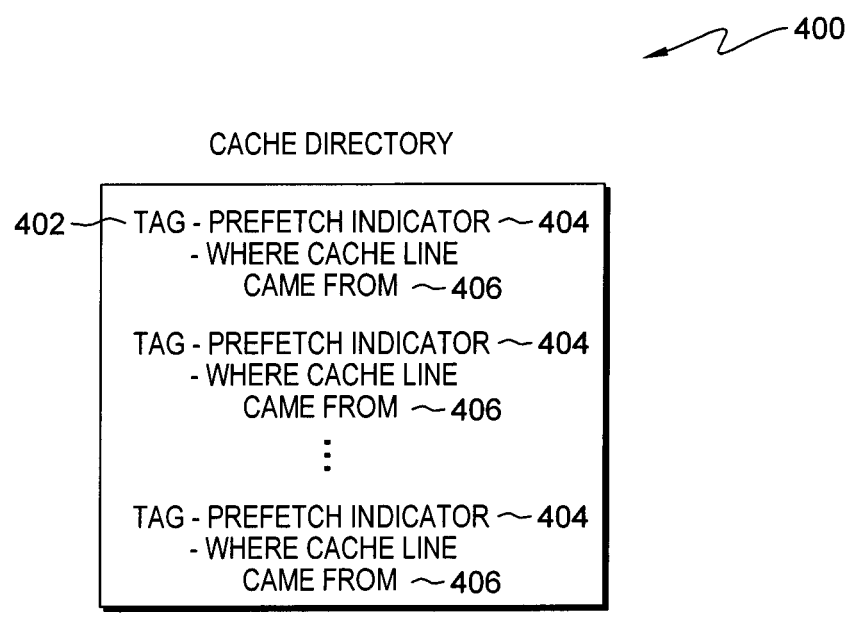
FIG. 4 depicts one example of a cache directory, in accordance with an aspect of the present invention.

Thereafter, or if the data is already in the cache, the cache directory is updated, STEP 306. For instance, as shown in FIG. 4, a cache directory 400 includes a tag 402 for each cache line (or a subset of cache lines, in another embodiment) in the cache. In accordance with an aspect of the present invention, tag 402 includes effectiveness information, such as a prefetch indicator 404 (e.g., a bit) that indicates if this data was brought into the cache for this prefetch instruction or for a normal load/store instruction. The indicator is set (e.g., to one) if the data was brought into the cache via the prefetch instruction. Optionally, additional information may be added to the cache directory, including, for instance, from what level of the cache directory or main memory the data came 406. Other and/or different information may also be included.

Returning to FIG. 3A, the effectiveness information is then obtained, STEP 308. For instance, instructions may be used to obtain the effectiveness information from the cache directory. The effectiveness information may indicate, for instance, where the data came from and/or other information, and thus, provide an indication of the effectiveness of the prefetch instruction.

As examples, load and store instructions are executed which provide (e.g., via a condition code) the effectiveness information, such as information on where the data originated. For example, a load instruction that loads data from memory into a processor register may provide, based on execution, one of the following condition codes:

00—data was already in the L1 cache at the time the load instruction executed and not from a prefetch.
01—data was already in the L1 cache at the time the load instruction executed but it was installed in the cache via a prefetch instruction.
10—data was not yet in the cache, but had been requested via a prior load, store or prefetch instruction when this instruction first attempted execution.
11—data was not in the cache and this instruction had to request it.

If the Instruction Set Architecture (ISA) provides for more than a 4-state condition code, more granular information may be returned, such as what level of the cache hierarchy the data came from. Other possibilities also exist.

In most implementations, data is to be in the L1 cache to store to it. In accordance with an aspect of the present invention, store instructions are utilized that provide (e.g., via a condition code) the cache residency information, as described above.

For instance, a store instruction that stores data into the cache may provide, based on execution one of the following condition codes:

00—data was already in the L1 cache at the time the store instruction executed and not from a prefetch.
01—data was already in the L1 cache at the time the store instruction executed but it was installed in the cache via a prefetch instruction.
10—data was not yet in the cache, but had been requested via a prior store, load or prefetch instruction when this instruction first attempted execution.
11—data was not in the cache and this instruction had to request it.

Although in the above description the effectiveness information is provided via a condition code, it should be noted that other ISAs may use a different technique to achieve the same effect. For example, the status of the instruction's cache residency may be returned in a flag register. In another embodiment, a special register is loaded that may be subsequently queried by a software instruction to determine the cache residency status of the immediately prior memory accessing instruction.

The effectiveness information may then be used to determine the effectiveness of the prefetch instruction, STEP 310. For instance, the effectiveness information may be used to determine whether a prefetch instruction should be included in the program in its current location. The software can use the effectiveness information, which includes, e.g., information about the cache residency status, to keep a count of what percentage of the time the data was already in the L1 cache due to a prior prefetch. The MRTE/JIT compiler can then, for instance, move the prefetches earlier to achieve higher efficiency. Alternatively, if most data is already in the cache, then the prefetch was unnecessary and it should probably be removed when the code is subsequently recompiled via the JIT. Other examples exist.

As indicated above, to provide the effectiveness information, in one example, load and/or store instructions are used. Further details regarding example load and store instructions are described with reference to FIGS. 5A-5B.

Figure 5A:
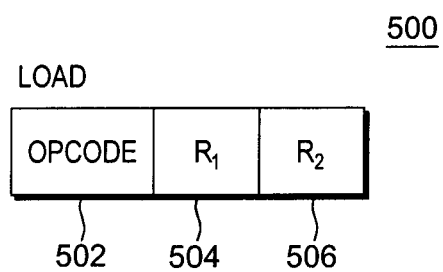
FIG. 5A depicts one example of a format of a load instruction used in accordance with an aspect of the present invention.

Referring to FIG. 5A, one example of a load instruction 500 is described. Load instruction 500 includes, for instance, an opcode field 502 that includes an operation code to specify a load operation; a first register field ($R_1$) 504 that designates a first register, the contents of which are referred to as a first operand location; and a second register field ($R_2$) 506 that designates a second register, the contents of which are referred to as a second operand. In operation, the second operand is placed unchanged at the first operand location.

Figure 5B:
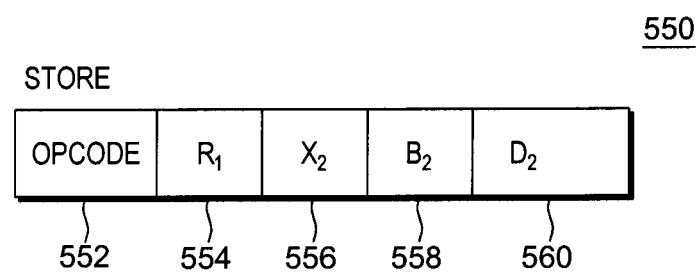
FIG. 5B depicts one example of a format of a store instruction used in accordance with an aspect of the present invention.

Referring to FIG. 5B, one example of a store instruction 550 is described. Store instruction 550 includes, for instance, an opcode field 552 that includes an operation code to specify a store operation; a first register field ($R_1$) 554 that designates a first register, the contents of which are referred to as a first operand operation; and an index field ($X_2$) 556, a base field ($B_2$) 558, and a displacement field ($D_2$) 560, which are used to provide a second operand location. For instance, the contents of the register designated by $X_2$ field 556 and the contents of the register designated by $B_2$ field 558 are added to the value in $D_2$ 560 to provide a second operand address. In operation of the store instruction, the first operand is placed unchanged at the second operand location.

In another example, the prefetch instruction itself provides the effectiveness information. For instance, the ISA architecture is changed (or new prefetch instructions are added) such that the prefetch instruction sets a condition code to indicate if the data to be prefetched was already in the L1 cache. It can also indicate via the condition code if the data was in another level cache, or had to be fetched all the way from main memory.

With this example, the prefetch instruction cannot be architecturally completed until the data returns from a higher level cache or main memory (or at least until its location in the cache hierarchy is known). Depending on the implementation, this may effectively reduce the size of the out-of-order window and provide less benefit from the prefetch instruction. An alternate is to have an artificial cut-off for the prefetch instruction so that it only goes out to the L1 or L2 cache (which is still relatively close to the CPU). Therefore, if the prefetch misses the L1 or L2 cache, the prefetch instruction is completed with a condition code indicating it was further away.

Yet another embodiment is to have a register or memory location that holds the result of the prefetch, with the register or memory location being updated asynchronously when the prefetch returns. The prefetch instruction, itself, completes immediately like a traditional prefetch instruction. However, the register or memory location is updated later, after the prefetch instruction completes.

Figure 3B:
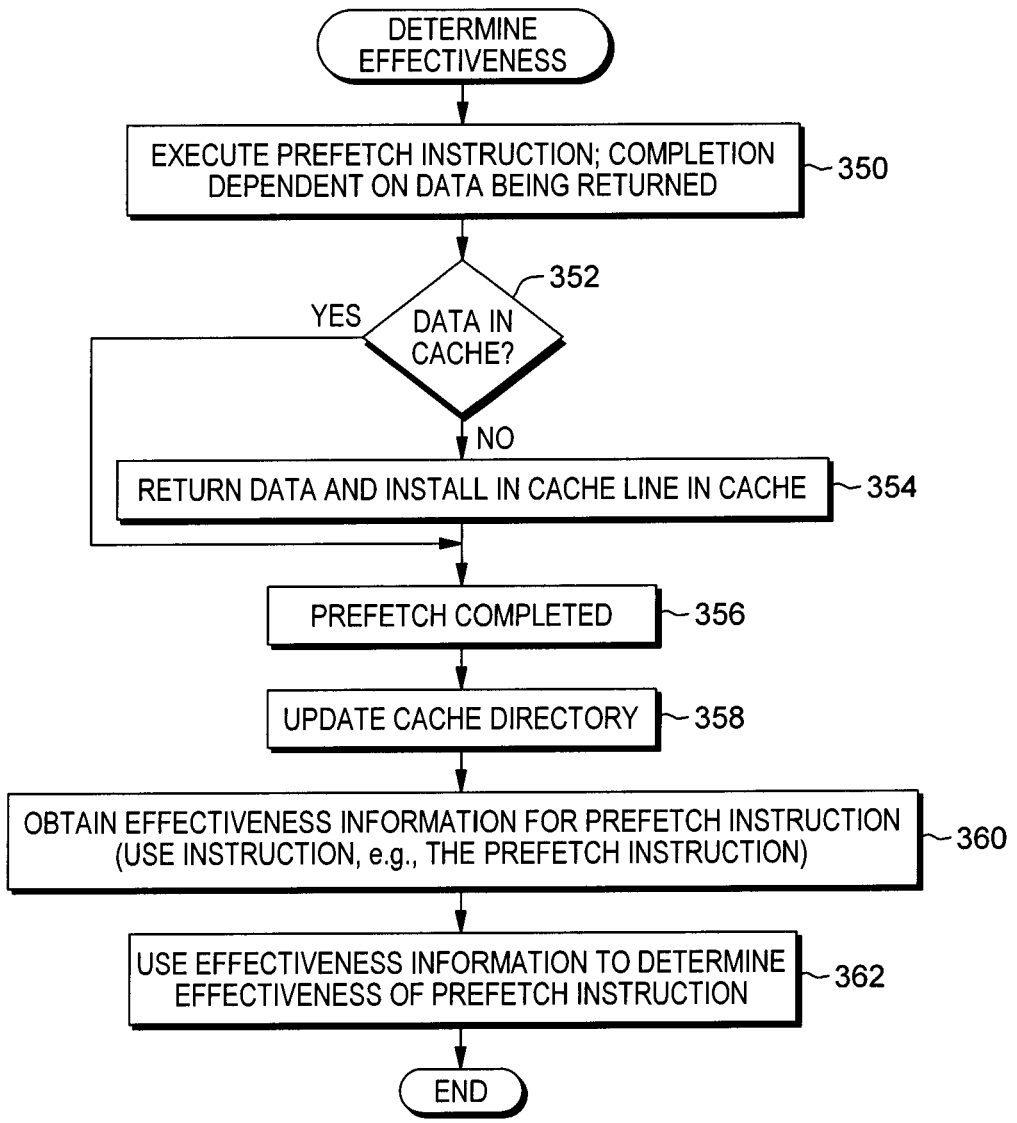
FIG. 3B depicts another embodiment of logic to determine the effectiveness of prefetch instructions, in accordance with an aspect of the present invention.

Another embodiment of logic to determine the effectiveness of a prefetch instruction is described with reference to FIG. 3B. This logic is performed by a processor (e.g., load/store unit 108 (FIG. 1)). Referring to FIG. 3B, a prefetch instruction is executed, STEP 350. In this example, the prefetch instruction does not execute in a conventional manner for a prefetch instruction, in which completion of the instruction is not dependent on the data, if any, being returned, but instead, cannot complete until the data, if any, is returned.

Based on executing the prefetch instruction, a determination is made as to whether the data is already in the cache, e.g., L1 data cache, INQUIRY 352. If the data is not already in the cache, then data is returned and is installed in the cache, STEP 354.

Thereafter, or if the data is in the cache, the prefetch instruction is completed, in due course, STEP 356. Further, the cache directory is updated, STEP 358, as described above. The effectiveness data is then obtained, STEP 360. For instance, the prefetch instruction may be used to indicate where the data came from and thus, the effectiveness of the prefetch instruction. As indicated above, the effectiveness information may be provided via, e.g., a condition code that indicates, for instance, where the data originated. For example, based on the prefetch instruction using a 2-bit condition code, the following encoding might be used:

00—data was already in the L1 cache at the time the prefetch instruction executed.
01—data was delivered from the L2 cache for the prefetch instruction.
10—data was delivered from a higher level cache than the L2 cache.
11—data was delivered from main memory.

If the Instruction Set Architecture (ISA) provides for more than a 4-state condition code, more granular information may be returned, such as what level of the cache hierarchy the data came from.

The effectiveness information may then be used to determine the effectiveness of the prefetch instruction, STEP 362, as indicated herein.

Figure 6A:
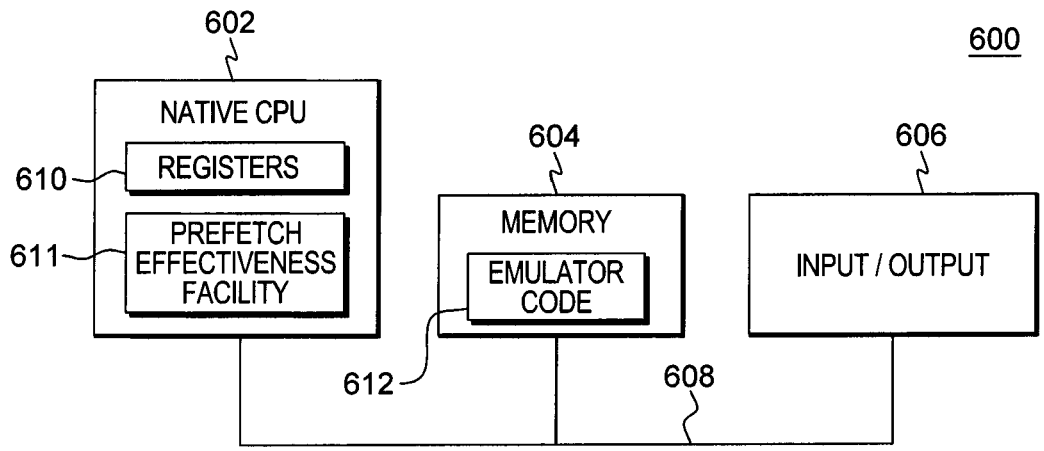
FIG. 6A depicts another example of a computing environment to incorporate and use one or more aspects of the present invention.

In addition to the above, one or more aspects of the present invention may be included and used in other types of computing environments. For instance, another example of a computing environment to incorporate and use one or more aspects of a prefetch request facility used to manage a prefetch queue is described with reference to FIG. 6A. In this example, a computing environment 600 includes, for instance, a native central processing unit (CPU) 602, a memory 604, and one or more input/output devices and/or interfaces 406 coupled to one another via, for example, one or more buses 608 and/or other connections. As examples, computing environment 600 may include a zSeries server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 602 includes one or more native registers 610, such as one or more general purpose registers and/or one or more special purpose registers used during processing within the environment, as well as a prefetch request facility 611. These registers include information that represents the state of the environment at any particular point in time.

Moreover, native central processing unit 602 executes instructions and code that are stored in memory 604. In one particular example, the central processing unit executes emulator code 612 stored in memory 604. This code enables the computing environment configured in one architecture to emulate one or more other architectures. For instance, emulator code 612 allows machines based on architectures other than the z/Architecture, such as PowerPC processors, Power Systems servers, HP Superdome servers or others, to emulate the z/Architecture and to execute software and instructions developed based on the z/Architecture.

Figure 6B:
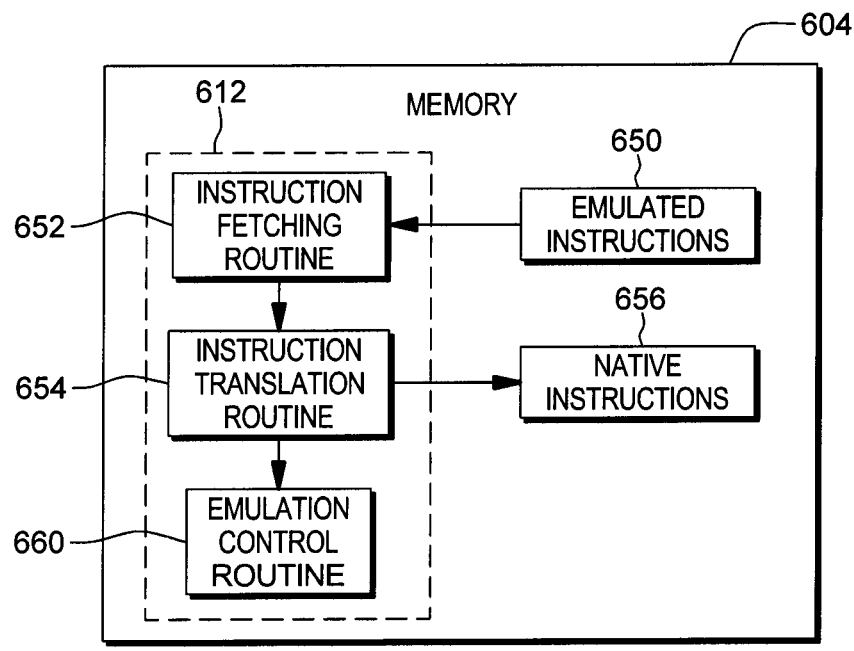
FIG. 6B depicts further details of the memory of FIG. 6A, in accordance with an aspect of the present invention.

Further details relating to emulator code 612 are described with reference to FIG. 6B. Emulated instructions 650 stored in memory 604 comprise software instructions (e.g., correlating to machine instructions) that were developed to be executed in an architecture other than that of native CPU 602. For example, emulated instructions 650 may have been designed to execute on a z/Architecture processor, but instead, are being emulated on native CPU 602, which may be, for example, an Intel Itanium II processor. In one example, emulator code 612 includes an instruction fetching routine 652 to obtain one or more emulated instructions 650 from memory 604, and to optionally provide local buffering for the instructions obtained. It also includes an instruction translation routine 654 to determine the type of emulated instruction that has been obtained and to translate the emulated instruction into one or more corresponding native instructions 656. This translation includes, for instance, identifying the function to be performed by the emulated instruction and choosing the native instruction(s) to perform that function.

Further, emulator code 612 includes an emulation control routine 660 to cause the native instructions to be executed. Emulation control routine 660 may cause native CPU 602 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 656 may include loading data into a register from memory 604; storing data back to memory from a register; or performing some type of arithmetic or logic operation, as determined by the translation routine.

In one example, in accordance with an aspect of the present invention, emulated instructions 650 include instructions (e.g., load, store, and/or prefetch instructions) to obtain the effectiveness information. An emulated instruction is translated, e.g., via instruction translation routine 654, to a host query to check whether the data is in the host cache, and then the results are returned in a manner visible to the emulated instruction.

Each routine is, for instance, implemented in software, which is stored in memory and executed by native central processing unit 602. In other examples, one or more of the routines or operations are implemented in firmware, hardware, software or some combination thereof. The registers of the emulated processor may be emulated using registers 610 of the native CPU or by using locations in memory 604. In embodiments, emulated instructions 650, native instructions 656 and emulator code 612 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Described herein is a capability of determining the effectiveness of prefetch instructions, in which information is returned to the software program for future use. This information includes, for instance, whether the data was placed in the cache by the prefetch instruction and/or the level of the cache or main memory from which the data came. As examples, a load, store or prefetch instruction may be used to provide the information to the software.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, said computer program product comprising:
    at least one computer readable storage medium readable by at least one processing circuit and storing instructions for performing a method comprising:
        executing a prefetch instruction to request that data be fetched into a selected location of a memory hierarchy of the computing environment; and
        determining effectiveness of the prefetch instruction, the determining the effectiveness comprising:
            providing, based on executing the prefetch instruction, effectiveness information relating to the data, the effectiveness information including an indicator, wherein based on the indicator having one value the data was installed in the selected location based on the prefetch instruction, and wherein based on the indicator having another value the data was installed in the selected location based on execution of another instruction different from the prefetch instruction;
            obtaining at least a portion of the effectiveness information; and
            using the at least a portion of the effectiveness information to determine the effectiveness of the prefetch instruction.

2. The computer program product of claim 1, wherein the selected location is a cache.

3. The computer program product of claim 2, wherein the obtaining the at least a portion of the effectiveness information comprises executing an instruction to obtain the at least a portion of the effectiveness information, the instruction comprising the prefetch instruction, the prefetch instruction being configured to complete subsequent to installing the data in the cache, based on the data being missing from the cache, and wherein the prefetch instruction returns a condition code, the condition code comprising one condition code selected from a group of condition codes consisting of: a first condition code indicating the data was already in the cache at a time the prefetch instruction executed; a second condition code indicating the data was delivered from another level cache for the prefetch instruction; a third condition code indicating the data was delivered from a higher level cache than the other level cache; and a fourth condition code indicating the data was delivered from main memory.

4. The computer program product of claim 1, wherein the effectiveness information is maintained within a cache directory.

5. The computer program product of claim 1, wherein based on executing the prefetch instruction and the data being missing from the selected location, the data is installed in the selected location, and wherein the prefetch instruction completes prior to installing the data in the selected location.

6. The computer program product of claim 1, wherein the obtaining the at least a portion of the effectiveness information comprises executing an instruction to obtain the at least a portion of the effectiveness information.

7. The computer program product of claim 6, wherein the instruction comprises a load instruction, the load instruction returning a condition code, the condition code comprising one condition code selected from a group of condition codes consisting of: a first condition code indicating the data was already in the selected location at a time the load instruction executed and not from a prefetch; a second condition code indicating the data was already in the selected location at the time the load instruction executed but it was installed in the selected location via a prefetch instruction; a third condition code indicating the data was not yet in the selected location, but had been requested via a prior load, store or prefetch instruction when this load instruction first attempted execution; and a fourth condition code indicating the data was not in the selected location and this load instruction had to request it.

8. The computer program product of claim 6, wherein the instruction comprises a store instruction, the store instruction returning a condition code, the condition code comprising one condition code selected from a group of condition codes consisting of: a first condition code indicating the data was already in the selected location at a time the store instruction executed and not from a prefetch; a second condition code indicating the data was already in the selected location at the time the store instruction executed but it was installed in the selected location via a prefetch instruction; a third condition code indicating the data was not yet in the selected location, but had been requested via a prior store, load or prefetch instruction when this store instruction first attempted execution; and a fourth condition code indicating the data was not in the selected location and this store instruction had to request it.

9. The computer program product of claim 6, wherein the instruction comprises the prefetch instruction, and wherein the method further comprises asynchronously storing a result of the prefetch instruction in a location for further updating subsequent to completion of the prefetch instruction.

10. The computer program product of claim 1, wherein the effectiveness information further includes an indication from where the data came.

11. A computer system for facilitating processing within a computing environment, said computer system comprising:
    a memory; and
    a processor in communication with the memory, wherein the computer system is configured to perform a method, said method comprising:

executing a prefetch instruction to request that data be fetched into a selected location of a memory hierarchy of the computing environment; and determining effectiveness of the prefetch instruction, the determining the effectiveness comprising:

provided, based on executing the prefetch instruction, effectiveness information relating to the data, the effectiveness information including an indicator, wherein based on the indicator having one value the data was installed in the selected location based on the prefetch instruction, and wherein based on the indicator having another value the data was installed in the selected location based on execution of another instruction different from the prefetch instruction;

obtaining at least a portion of the effectiveness information; and using the at least a portion of the effectiveness information to determine the effectiveness of the prefetch instruction.

12. The computer system of claim 11, wherein the effectiveness information further includes an indication from where the data came, wherein the from where the data came is selected from a group consisting of a level of a cache directory and main memory.

13. The computer system of claim 11, wherein the effectiveness information is maintained within a cache directory.

14. The computer system of claim 11, wherein based on executing the prefetch instruction and the data being missing from the selected location, the data is installed in the selected location, and wherein the prefetch instruction completes prior to installing the data in the selected location.

15. The computer system of claim 11, wherein the obtaining the at least a portion of the effectiveness information comprises executing an instruction to obtain the at least a portion of the effectiveness information.

16. A computer-implemented method of facilitating processing within a computing environment, said computer-implemented method comprising:

executing a prefetch instruction to request that data be fetched into a selected location of a memory hierarchy of the computing environment; and determining effectiveness of the prefetch instruction, the determining the effectiveness comprising:

providing, based on executing the prefetch instruction, effectiveness information relating to the data, the effectiveness information including an indicator, wherein based on the indicator having one value the data was installed in the selected location based on the prefetch instruction, and wherein based on the indicator having another value the data was installed in the selected location based on execution of another instruction different from the prefetch instruction;

obtaining at least a portion of the effectiveness information; and using the at least a portion of the effectiveness information to determine the effectiveness of the prefetch instruction.

17. The computer-implemented method of claim 16, wherein the selected location is a cache.

18. The computer-implemented method of claim 16, wherein the effectiveness information is maintained within a cache directory.

19. The computer-implemented method of claim 16, wherein based on executing the prefetch instruction and the data being missing from the selected location, the data is installed in the selected location, and wherein the prefetch instruction completes prior to installing the data in the selected location.

20. The computer-implemented method of claim 16, wherein the obtaining the at least a portion of the effectiveness information comprises executing an instruction to obtain the at least a portion of the effectiveness information.

* * * * *